(12) United States Patent
Li et al.

(10) Patent No.: US 10,377,638 B2
(45) Date of Patent: Aug. 13, 2019

(54) STABILIZED MICROPOROUS CRYSTALLINE MATERIAL, THE METHOD OF MAKING THE SAME, AND THE USE FOR SELECTIVE CATALYTIC REDUCTION OF $NO_x$

(71) Applicant: PQ CORPORATION, Valley Forge, PA (US)

(72) Inventors: Hong-Xin Li, Lansdale, PA (US);
Bjorn Moden, Glen Mills, PA (US);
David Cooper, Morrisville, PA (US);
William E. Cormier, Harleysville, PA (US)

(73) Assignee: PQ Corporation, Valley Forge, PA (US)

( * ) Notice: Subject to any disclaimer, the term of this patent is extended or adjusted under 35 U.S.C. 154(b) by 712 days.

(21) Appl. No.: 14/682,640

(22) Filed: Apr. 9, 2015

(65) Prior Publication Data
US 2016/0296924 A1 Oct. 13, 2016

(51) Int. Cl.
*C01B 39/02* (2006.01)
*B01J 29/76* (2006.01)
(Continued)

(52) U.S. Cl.
CPC ........ *C01B 39/026* (2013.01); *B01D 53/8628* (2013.01); *B01D 53/90* (2013.01);
(Continued)

(58) Field of Classification Search
CPC ..... C01B 39/026; C01B 39/30; C01B 39/305;
C01B 39/46; C01B 39/48; C01P 2002/60;
C01P 2002/72; B01L 29/50; B01L 29/56;
B01L 29/70; B01L 29/7003; B01L
29/7015; B01L 29/7049; B01L 29/7053;
(Continued)

(56) References Cited

U.S. PATENT DOCUMENTS 7,601,662 B2 * 10/2009 Bull ................... B01D 53/9418
423/700
9,162,218 B2 * 10/2015 Bull ................... B01D 53/9418
(Continued)

FOREIGN PATENT DOCUMENTS

| WO | WO 2010/054034 A2 | 5/2010 |
|----|---|---|
| WO | WO 2013/082550 A1 | 6/2013 |
| WO | WO 2013/082560 A1 | 6/2013 |

*Primary Examiner* — David M Brunsman
(74) *Attorney, Agent, or Firm* — Finnegan, Henderson, Farabow, Garrett & Dunner LLP (57) ABSTRACT

There is disclosed a microporous crystalline material comprising a crystal structure having building units of double-6-rings (d6r) and pore opening of 8-rings, wherein the material comprises a first metal chosen from alkali-earth group, rare-earth group, alkali group or mixtures thereof, and a second metal chosen from copper, iron or mixtures thereof, wherein the material has molar silica to alumina ratio (SAR) from 3 to 12, and is further steamed to enhance stability. Methods of making the crystalline material are also disclosed. There is also disclosed a method of selective catalytic reduction of nitrogen oxides in exhaust gas, comprising at least partially contacting the exhaust gases with an article comprising the disclosed microporous crystalline material.

38 Claims, 2 Drawing Sheets

(51) Int. Cl.
*B01D 53/94* (2006.01)
*B01J 29/70* (2006.01)
*C01B 39/46* (2006.01)
*B01D 53/86* (2006.01)
*B01D 53/90* (2006.01)
*C01B 39/30* (2006.01)
*C01B 39/48* (2006.01)
*B01J 29/50* (2006.01)
*B01J 29/56* (2006.01)

(52) U.S. Cl.
CPC .......... *B01D 53/9418* (2013.01); *B01J 29/50* (2013.01); *B01J 29/56* (2013.01); *B01J 29/70* (2013.01); *B01J 29/7003* (2013.01); *B01J 29/7015* (2013.01); *B01J 29/7049* (2013.01); *B01J 29/7053* (2013.01); *B01J 29/7065* (2013.01); *B01J 29/76* (2013.01); *B01J 29/763* (2013.01); *B01J 29/7607* (2013.01); *C01B 39/30* (2013.01); *C01B 39/305* (2013.01); *C01B 39/46* (2013.01); *C01B 39/48* (2013.01); *B01D 2251/208* (2013.01); *B01D 2251/2062* (2013.01); *B01D 2251/2067* (2013.01); *B01D 2253/1085* (2013.01); *B01D 2255/50* (2013.01); *B01D 2257/404* (2013.01); *B01J 2229/18* (2013.01); *B01J 2229/183* (2013.01); *B01J 2229/186* (2013.01); *B01J 2229/24* (2013.01); *B01J 2229/36* (2013.01); *C01P 2002/60* (2013.01); *C01P 2002/72* (2013.01)

(58) Field of Classification Search
CPC .. B01L 29/7065; B01L 29/7307; B01L 29/76; B01L 29/763; B01L 2229/18; B01L 2229/183; B01L 2229/186; B01L 2229/24; B01L 2229/36; B01D 53/9418; B01D 2251/2062; B01D 2251/2067; B01D 2253/1085; B01D 2255/50
See application file for complete search history.

(56) References Cited

U.S. PATENT DOCUMENTS 9,517,458 B2 * 12/2016 Li .............................. B01J 29/88
2013/0142727 A1 * 6/2013 Li .............................. B01J 29/88
423/709
2014/0154175 A1 6/2014 Li et al.

* cited by examiner

STABILIZED MICROPOROUS CRYSTALLINE MATERIAL, THE METHOD OF MAKING THE SAME, AND THE USE FOR SELECTIVE CATALYTIC REDUCTION OF $NO_x$

The present disclosure generally relates to a microporous crystalline material having building units of double-6-rings (d6r) and pore opening of 8-rings. The present disclosure more particularly relates microporous crystalline material comprising a first metal chosen from alkali-earth group, rare-earth group, alkali group, or mixtures thereof, a second metal chosen from iron and/or copper, and having molar silica to alumina ratio (SAR) from 3 to 12. The present disclosure also relates to methods of making such a material, that may include steaming to enhance its stability, and using such stabilized microporous crystalline material, including for selective catalytic reduction (SCR) of nitrogen oxides ($NO_x$) in exhaust gases.

Nitric oxides ($NO_x$) have been known to be polluting gases, principally by reason of their corrosive action. In fact, they are the primary reason for the cause of acid rain. A major contributor of pollution by $NO_x$ is their emission in the exhaust gases of diesel automobiles and stationary sources such as coal-fired power plants and turbines. To avoid these harmful emissions, SCR is employed and involves the use of zeolitic catalysts in converting $NO_x$ to nitrogen and water.

Thus, there is a continuing need for improved microporous crystalline material that has enhanced performance and hydrothermal stability properties to allow for the selective catalytic reduction of $NO_x$ in exhaust gases, even under extreme temperature and humidity conditions.

SUMMARY

In part to address this need, the present disclosure is directed to a material for the selective catalytic reduction of $NO_x$ in exhaust gases that has enhanced performance and hydrothermal stability properties under extreme temperature and humidity conditions.

There is disclosed a microporous crystalline material having building units of double-6-rings (d6r) and pore opening of 8-rings, comprising a first metal chosen from alkali-earth group, rare-earth group, alkali group, or mixtures thereof, a second metal chosen from iron and/or copper. In one embodiment, the microporous crystalline material has a molar silica to alumina ratio (SAR) from 3 to 12, and exhibits an $NH_3$ adsorption capacity expressed as the molar $NH_3/Al$ ratio of 0.7 to 0.9.

There is also disclosed a method of selective catalytic reduction (SCR) of nitrogen oxides in exhaust gas, comprising at least partially contacting said exhaust gases with an article comprising a microporous crystalline material having building units of double-6-rings (d6r) and pore opening of 8-rings, wherein the material comprises a first metal chosen from alkali-earth group, rare-earth group, alkali group or mixtures thereof, and a second metal chosen from copper, iron or mixtures thereof. The material used in this method of SCR has a molar silica to alumina ratio (SAR) from 3 to 12; and exhibits an $NH_3$ adsorption capacity expressed as the molar $NH_3/Al$ ratio of 0.7 to 0.9.

There is also disclosed a method of making a microporous crystalline material described herein. The method of making comprises synthesizing a material having building units of double-6-rings (d6r) and pore opening of 8-rings, where the material has molar silica to alumina ratio (SAR) from 3 to 12, and exhibits an $NH_3$ adsorption capacity expressed as the molar $NH_3/Al$ ratio of 0.7 to 0.9. In an embodiment, the method comprises mixing sources of sodium, potassium, alumina, silica, water and optionally an organic template to form a gel; heating the gel in a vessel at a temperature ranging from 80 to 200° C. to form a crystalline material; ammonium-exchanging the material; introducing a first metal chosen from alkali-earth group, rare-earth group, alkali group or mixtures thereof, and a second metal chosen from copper, iron or mixtures thereof, into said crystalline material by liquid-phase or solid ion-exchange, impregnation; and steaming said material at 400 to 800° C. in 1 to 100% steam for at least 0.1 hour.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in, and constitute a part of this specification.

DETAILED DESCRIPTION

As used in the present disclosure, "hydrothermally stable" means that the crystalline material has the ability to retain a certain percentage of initial surface area and/or microporous volume after exposure to elevated temperature and/or humidity conditions (compared to room temperature) for a certain period of time.

Surface area was determined in accordance with the well-known BET (Brunauer-Emmett-Teller) nitrogen adsorption technique, also referred to as the "BET method." Herein the general procedure and guidance of ASTM D4365-95 is followed in the application of the BET method to the materials according to the present disclosure. To ensure a consistent state of the sample to be measured, all samples are pretreated. Suitably pretreatment involves heating the sample, for example to a temperature of 400 to 500° C., for a time sufficient to eliminate free water, such as 3 to 5 hours. In one embodiment, the pretreatment consists in heating each sample to 500° C. for 4 hours.

"Initial Surface Area" refers to the surface area of the freshly made crystalline material before exposing it to any aging conditions.

"Micropore volume" refers to indicate the total volume of pores having a diameter of less than 20 angstroms. "Initial Micropore Volume" means the micropore volume of the freshly made crystalline material, i.e., before exposing it to any aging conditions. The assessment of micropore volume is particularly derived from the BET measurement techniques by an evaluation method called the t-plot method (or sometimes just termed the t-method) as described in the literature (Journal of Catalysis 3, 32 (1964)).

"Mesopore volume" refers to the volume of pores having a diameter of greater than 20 angstroms up to the limit of 600 angstroms.

Similarly, "micropore area" refers to the surface area in pores less 20 angstroms, and "mesopore area" refers to the surface area in pores between 20 angstroms and 600 angstroms.

"$NH_3$ adsorption capacity" refers to the amount of $NH_3$ adsorbed, as measured using the following $NH_3$ temperature programmed desorption ($NH_3$-TPD) technique. Prior to $NH_3$-TPD, materials were heated in situ in argon at 10° C./min to 520° C. and kept at this temperature for 1 hour. The furnace was then cooled to 100° C. $NH_3$ was adsorbed onto the zeolite at 100° C. for 1 hour using 2000 ppm $NH_3/N_2$, followed by flowing argon for 1 hour to remove physisorbed $NH_3$. During the $NH_3$-TPD, a ramping rate of 10° C./min from 100 to 650° C. was used while flowing argon and monitoring the thermal conductivity of the outlet gas. The thermal conductivity signal was integrated between 100 and 650° C., and was converted to mmol $NH_3$/g by comparing the integrated area to that of a material with known $NH_3$ adsorption capacity.

The $NH_3$ adsorption capacity can also be expressed as the "molar $NH_3$/Al ratio". The molar $NH_3$/Al ratio is the ratio of the mmol $NH_3$/g measured by $NH_3$-TPD and the mmol Al/g measured by X-ray Fluorescence (XRF).

"Direct synthesis" (or any version thereof) refers to a method of introducing cationic metals or metal clusters during zeolite synthesis. A direct synthesis method is in contrast to a method of introducing cationic metals or metal clusters that requires a post-synthetic process, such as by cationic exchange, impregnation, or chemical vapor deposition of metal precursors after zeolite crystallization. Direct synthesis does not suffer from the drawbacks associated with post-synthetic procedures, such as the need of several steps to achieve the required metal-containing zeolite, the lack of uniformity in the distribution of the metal within the channels and cavities, and the limitation for efficient diffusion of the metal in small pore zeolites depending on its ionic radius.

"Defined by the Structure Commission of the International Zeolite Association," is intended to mean those structures included but not limited to, the structures described in "Atlas of Zeolite Framework Types," Baerlocher et al. Sixth Revised Edition (Elsevier 2007), which is herein incorporated by reference in its entirety. For example, this reference shows the "Double-6-rings (d6r)" described and claimed herein, is a structural building unit.

"Selective Catalytic Reduction" or "SCR" refers to the reduction of $NO_x$ (typically with ammonia) in the presence of oxygen to form nitrogen and $H_2O$.

"Exhaust gas" refers to any waste gas formed in an industrial process or operation and by internal combustion engines, such as from any form of motor vehicle.

The phrases "chosen from" or "selected from" as used herein refers to selection of individual components or the combination of two (or more) components. For example, the metal portion of the large crystal, organic-free chabazite described herein may be chosen from copper and iron, which means the metal may comprise copper, or iron, or a combination of copper and iron.

The present application discloses crystalline materials, such as microporous aluminosilicate zeolite, including an aluminosilicate chabazite, methods of making them, and methods of using them for the selective catalytic reduction of nitric oxides. In one aspect, the microporous crystalline material has building units of double-6-rings (d6r) and pore opening of 8-rings. The disclosed crystalline material typically falls within the structural codes for the materials described herein include CHA, LEV, AEI, AFT, AFX, EAB, ERI, KFI, SAT, TSC, and SAV, with the crystal structure CHA being particularly noted.

The foregoing CHA crystal structure generally has a unit cell angle below 94.55 degrees, such as a unit cell angle ranging from 94.30-94.50 degrees. The unit cell may also have a [3 2 0] peak below 36.05 degrees 2-theta.

In one embodiment, the material has molar silica to alumina ratio (SAR) from 3 to 12, such as from 5 to 10, and exhibits an $NH_3$ adsorption capacity expressed as the molar $NH_3$/Al ratio of 0.7 to 0.9. The material, which may have pore opening ranging from 3 to 5 Angstroms, can further include a first metal chosen from alkali-earth group, rare-earth group, alkali group or mixtures thereof, and a second metal chosen from copper, iron or mixtures thereof.

The first metal may comprise Alkali-earth metals, which are the 6 elements that are located in Group 2 elements of the Periodic Table. Non-limiting examples of the alkali-earth metal that can comprise the first metal used herein include magnesium, calcium, strontium, or barium, or mixtures thereof. Alkali metals are the 6 elements that are located in Group 1 elements of the Periodic Table, excluding hydrogen. Non-limiting examples of the alkali metal that can comprise the first metal used herein include potassium, rubidium, cesium, or mixtures thereof.

In one embodiment, the first metal comprises magnesium, calcium, strontium, barium, lanthanum, cerium, praseodymium, neodymium, mixed rare earth oxides, potassium, rubidium, cesium or mixtures thereof.

As described herein, the second metal, such as copper, may comprise an amount ranging from 0.5 to 10.0 weight percent of the total weight of the crystalline material. When the second metal comprises copper, it is typically used in an amount ranging from 0.5 to 10.0 weight percent of the total weight of the crystalline material, such as from 0.5 to 8.0 wt. %, from 0.5 to 6.0 wt. %, from 0.5 to 5.0 wt. %, from 1.0 to 8.0 wt. %, from 2.0 to 8.0 wt. %, and from 3.0 to 6.0 wt. %.

In one embodiment, the second metal of the material is copper, and the copper to aluminum atomic ratio is between 0.05 and 0.20.

The microporous crystalline material may also contain iron in an amount ranging from 0.5 to 10.0 weight percent of the total weight of the crystalline material.

When the second metal comprises iron, it is also typically used in an amount ranging from 0.5 to 10.0 weight percent of the total weight of the crystalline material such as from 0.5 to 8.0 wt. %, from 0.5 to 6.0 wt. %, from 0.5 to 5.0 wt. %, from 1.0 to 8.0 wt. %, from 2.0 to 8.0 wt. %, and from 3.0 to 6.0 wt. %.

In one embodiment, the second metal of the material is iron, and the iron to aluminum atomic ratio is between 0.05 and 0.30.

The first and second metals described above may be introduced into the microporous crystalline material by liquid-phase or solid ion-exchange, impregnation or incorporated by direct-synthesis.

However these first and second metals are introduced into the crystalline material, the resulting crystalline material may have a first metal to aluminum atomic ratio ranging from 0.04 to 0.85, such as from 0.05 to 0.80.

When the microporous crystalline material includes calcium, the resulting crystalline material may have a calcium to aluminum atomic ratio ranging from 0.04 to 0.60, such as from 0.05 to 0.50.

When the microporous crystalline material includes copper, the resulting crystalline material may have a copper to aluminum atomic ratio ranging from 0.04 to 0.30, such as from 0.05 to 0.20.

When the microporous crystalline material described herein includes iron as the second metal, the resulting crystalline material may have an iron to aluminum atomic ratio ranging from 0.04 to 0.40, such as from 0.05 to 0.30.

In one embodiment, the microporous crystalline material described herein is steamed at temperatures ranging from 400 to 800° C. in the presence of steam containing 1-100% water for a time of at least 0.1 hours in order to improve the stability towards immersion in water. After this treatment, the material may reach the desired $NH_3/Al$ ratio of 0.7-0.9.

In one embodiment, the steam treatment temperature typically ranges from 400 to 800° C., such as from 450 to 700° C. and from 500 to 600° C.

In one embodiment, the water content in the steam during the steam treatment typically ranges from 1 to 100%, such as from 5 to 60% and from 10 to 20%.

In one embodiment, the time duration of the steam treatment is at least 0.1 hours and typically ranges from 0.5 to 16 hours, such as from 1 to 10 hours and from 1 to 3 hours.

The microporous crystalline material described herein has been shown to retain at least 80%, 85%, or 90%, or even 95% of its surface area after exposure to conditions that include immersion in water at ambient temperature for 1 hour.

The first metal, which includes, for example, magnesium, calcium, strontium, barium, lanthanum, cerium, praseodymium, neodymium, mixed rare earth oxides, potassium, rubidium, cesium or mixtures thereof, and second metals, e.g. copper or iron or mixtures thereof, can be introduced by liquid-phase or solid ion-exchange, impregnation or incorporated by direct-synthesis.

In one aspect, the first and second metals may be introduced into the material by liquid-phase or solid ion-exchange, impregnation or incorporated by direct-synthesis.

In one embodiment, the first metal comprises an amount of at least 0.2 weight percent of the total weight of the material, and in one embodiment, in an amount ranging from 0.1 to 6.0 weight percent, such as 0.2 to 5.0 weight percent. In one embodiment, the first metal comprises calcium in an amount ranging from 0.2 to 5.0 weight percent of the total weight of the crystalline material.

The atomic ratio of the first metal to aluminum may be between 0.05 and 0.80. In one embodiment, the first metal of the material is calcium, and the calcium to aluminum atomic ratio ranges from 0.04 to 0.60, such as from 0.05 and 0.50.

The material disclosed herein may be synthesized by a method comprising: mixing sources of sodium, potassium, alumina, silica, water and optionally a crystalline seed material to form a gel, wherein said gel has potassium to silica ($K/SiO_2$) molar ratio of less than 0.5 and hydroxide to silica ($OH/SiO_2$) molar ratio less than 0.35; heating said gel in a vessel at a temperature ranging from 80 to 200° C. to form a crystalline product; ammonium-exchanging said product; and introducing first and second metals into the crystalline material by liquid-phase or solid ion-exchange, impregnation or incorporated by direct-synthesis.

In another embodiment, the method comprises a direct synthesis process such that the first and second metals are introduced into the crystalline material prior to crystallization.

In one embodiment, the alumina and silica sources disclosed comprise potassium-exchanged, proton-exchanged, ammonium-exchanged zeolite Y, potassium silicate or mixtures thereof.

There is also disclosed a method of selective catalytic reduction of nitrogen oxides in exhaust gas that utilizes the crystalline materials described herein. For example, an aspect of the disclosed method comprises at least partially contacting exhaust gases with an article comprising a microporous crystalline material having building units of double-6-rings (d6r) and pore opening of 8-rings, where the material has molar silica to alumina ratio (SAR) from 3 to 12, wherein the material exhibits an $NH_3$ adsorption capacity expressed as the molar $NH_3/Al$ ratio of 0.7 to 0.9, wherein the material comprises a first metal chosen from alkali-earth group, rare-earth group, alkali group or mixtures thereof, and a second metal chosen from copper, iron or mixtures thereof.

The materials that can be used in this method include those that have the following structural codes CHA, LEV, AEI, AFT, AFX, EAB, ERI, KFI, SAT, TSC, and SAV, with the crystal structure CHA being particularly noted. The inventors have surprisingly discovered that materials after steam treatment exhibit excellent stability properties towards immersion in water. As a result, the materials described can be used in a method of selective catalytic reduction (SCR) of nitrogen oxides in exhaust gas because they exhibit excellent SCR properties, while retaining at least 80%, 85%, or 90%, or even 95% of its surface area after exposure to conditions that include immersion in water at ambient temperature for 1 hour.

As previously described, the disclosed microporous crystalline material may be steamed at temperatures ranging from 400 to 800° C. in the presence of steam containing 1-100% water for a time of at least 0.1 hours in order to improve the stability towards immersion in water. After this treatment, the material may reach the desired $NH_3/Al$ ratio of 0.7-0.9.

In one embodiment, the steam treatment temperature typically ranges from 400 to 800° C., such as from 450 to 700° C. and from 500 to 600° C.

In one embodiment, the water content in the steam during the steam treatment typically ranges from 1 to 100%, such as from 5 to 60% and from 10 to 20%.

In one embodiment, the time duration of the steam treatment is at least 0.1 hours and typically ranges from 0.5 to 16 hours, such as from 1 to 10 hours and from 1 to 3 hours.

The inventors have also surprisingly discovered that these beneficial properties are at least somewhat a result of a first metal included in the microporous crystalline materials, including magnesium, calcium, strontium, barium, lanthanum, cerium, praseodymium, neodymium, mixed rare earth oxides, potassium, rubidium, cesium or mixtures thereof, and the second metal, which can be copper, iron or mixtures thereof. Whatever combination of first metals and second metals are chosen, that may be introduced into the microporous crystalline material by liquid-phase or solid ion-exchange, impregnation or incorporated by direct-synthesis.

The method of SCR described herein is performed after the first and second metals are introduced into the microporous crystalline material in certain desired ratios. For example, the resulting crystalline material may have a first metal to aluminum atomic ratio ranging from 0.04 to 0.85, such as from 0.05 to 0.80.

More specifically, the method of SCR described herein may be performed with a microporous crystalline material that includes calcium, and the resulting crystalline material may have a calcium to aluminum atomic ratio ranging from 0.04 to 0.60, such as from 0.05 to 0.50.

The method of SCR described herein may be performed with a microporous crystalline material that includes copper, and the resulting crystalline material may have a copper to aluminum atomic ratio ranging from 0.04 to 0.30, such as from 0.05 to 0.20.

The method of SCR described herein may be performed with a microporous crystalline material that includes iron, and the resulting crystalline material may have an iron to aluminum atomic ratio ranging from 0.04 to 0.40, such as from 0.05 to 0.30.

In one embodiment, the contacting step in the method of SCR may be performed in the presence of ammonia, urea or an ammonia generating compound.

In another embodiment, the contacting step in the method of SCR may be performed in the presence of hydrocarbon compound.

There is also disclosed a method of making a microporous crystalline material, as described herein. In one embodiment, the method comprises synthesizing a material having building units of double-6-rings (d6r) and pore opening of 8-rings, where the material has molar silica to alumina ratio (SAR) from 3 to 12, wherein the material exhibits an $NH_3$ adsorption capacity expressed as the molar $NH_3/Al$ ratio of 0.7 to 0.9;

mixing sources of sodium, potassium, alumina, silica, water and optionally an organic template to form a gel;
heating the gel in a vessel at a temperature ranging from 80 to 200° C. to form a crystalline material;
ammonium-exchanging said material;
introducing a first metal chosen from alkali-earth group, rare-earth group, alkali group or mixtures thereof, and a second metal chosen from copper, iron or mixtures thereof, into the crystalline material by liquid-phase ion-exchange, solid ion-exchange, or impregnation; and
steaming said material at 400 to 800° C. in 1 to 100% steam for at least 0.1 hours.

The material may be synthesized by a process free of organic structure directing agent (OSDA).

In one embodiment, the gel has a potassium to silica ($K/SiO_2$) molar ratio of less than 0.75, such as less than 0.5 and hydroxide to silica ($OH/SiO_2$) molar ratio less than 0.50, such as less than 0.35.

In an embodiment, the method may further comprise adding a crystalline seed material to the gel.

In an embodiment, the first metal and the second metal are incorporated into the structure by direct-synthesis prior to heating the gel.

In one embodiment, alumina and silica sources comprise potassium-exchanged, proton-exchanged, ammonium-exchanged zeolite Y, potassium silicate or mixtures thereof.

The method of making a microporous crystalline material, may also include the various elements, in the defined amounts and ratios, as described herein.

For example, the materials that can be used in this method include those that have the following structural codes CHA, LEV, AEI, AFT, AFX, EAB, ERI, KFI, SAT, TSC, and SAV, with the crystal structure CHA being particularly noted. The inventors have surprisingly discovered that materials encompassed by the CHA crystal structure, that have a unit cell angle below 94.55 degrees, such as a unit cell angle ranging from 94.30-94.50 degrees, and that may also have a [3 2 0] peak below 36.05 degrees 2-theta, exhibit excellent stability properties, even at high temperatures. The desired unit cell angle and [3 2 0] peak position may be obtained by steaming the material described herein at temperatures ranging from 400 to 800° C. in the presence of steam containing 1-100% water for a time of at least 0.1 hours.

As previously described, the disclosed microporous crystalline material may be steamed at temperatures ranging from 400 to 800° C., such as from 450 to 700° C., or even from 500 to 600° C., in the presence of steam containing 1-100% water, such as from 5 to 60%, or from 10 to 20%, for a time of at least 0.1 hours, such as from 0.5 to 16 hours, from 1 to 10 hours, or from 1 to 3 hours, in order to improve the stability towards immersion in water. After this treatment, the material may reach the desired $NH_3/Al$ ratio of 0.7-0.9.

These materials retaining at least 80%, 85%, or 90%, or even 95% of its surface area after exposure to conditions that include immersion in water at ambient temperature for 1 hour. These metals, in addition to the second metals, which are chosen from copper, iron or mixtures thereof, may be introduced into the microporous crystalline material by liquid-phase or solid ion-exchange, impregnation or incorporated by direct-synthesis.

However these first and second metals are introduced, the resulting crystalline material may have a first metal to aluminum atomic ratio ranging from 0.04 to 0.85, such as from 0.05 to 0.80.

The microporous crystalline material described herein may include calcium, and the resulting crystalline material may have a calcium to aluminum atomic ratio ranging from 0.04 to 0.60, such as from 0.05 to 0.50.

The microporous crystalline material described herein may include copper, and the resulting crystalline material may have a copper to aluminum atomic ratio ranging from 0.04 to 0.30, such as from 0.05 to 0.20.

The microporous crystalline material described herein may include iron, and the resulting crystalline material may have an iron to aluminum atomic ratio ranging from 0.04 to 0.40, such as from 0.05 to 0.30.

As mentioned, the material used in the described method may comprise a crystal structure having building units of double-6-rings (d6r) and pore opening of 8 rings as exemplified with framework types defined by the Structure Commission of the International Zeolite Association having structural codes of CHA, LEV, AEI, AFT, AFX, EAB, ERI, KFI, SAT, TSC, and SAV, with a particular emphasis on CHA.

The morphology and crystallite size of the material according to the present disclosure are determined using scanning electron microscopy (SEM). In one embodiment, the mean particle size of the inventive material as measured by SEM is greater than 0.30 microns, such as greater than 1.0 microns, and less than 5 microns.

In various embodiments, the mean crystallite size is greater than 0.5 micrometers. In one embodiment, the material used in the disclosed method comprises crystals in size ranging from 0.3 and 5 microns.

EXAMPLES

The following non-limiting examples, which are intended to be exemplary, further clarify the present disclosure.

Example 1

Large Crystal Organic-free Chabazite Synthesis

Deionized water, potassium hydroxide solution (45 wt % KOH) and potassium-exchanged zeolite Y powder were mixed together to form a gel with the following composition: 5.5 $SiO_2$:1.0 $Al_2O_3$:1.09 $K_2O$: 66 $H_2O$. This gel composition had an $OH/SiO_2$ ratio of 0.05. The gel was stirred at room temperature for about 30 minutes. Then 1.5 wt % of chabazite seeds were added, and it was stirred for another 30 min. The gel was then charged to an autoclave. The autoclave was heated to 120° C. and maintained at the temperature for 60 hours while stirring at 300 rpm. After cooling, the product was recovered by filtration and washed with deionized water. The resulting product had the XRD pattern of chabazite, an SAR of 5.5 and contained 16.5 wt % $K_2O$. The product was exchanged with ammonium nitrate four times to reduce the potassium content to 0.27 wt % $K_2O$.

Example 2

Ca-exchange of Ammonium Exchanged Chabazite

The sample from Example 1 was subsequently exchanged with calcium nitrate at 80° C. for 2 hours. Following the exchange, the material was filtered, washed with deionized water and then dried.

Example 3

Fe-exchange of Ca-chabazite

The calcium-exchanged chabazite sample from Example 2 was exchanged with ferrous sulfate at ambient temperature for 3 hours. After filtering, washing and drying the sample contained 2.5 wt % CaO and 5.2 wt % $Fe_2O_3$.

Example 4

Large Crystal Organic-free Chabazite Synthesis

Deionized water, potassium hydroxide solution (45 wt % KOH) and potassium-exchanged zeolite Y powder were mixed together to form a gel with the following composition: 5.5 $SiO_2$: 1.0 $Al_2O_3$: 1.02 $K_2O$: 66 $H_2O$. This gel composition had an $OH/SiO_2$ ratio of 0.025. The gel was stirred at room temperature for about 30 minutes. Next 0.5 wt % of chabazite seeds were added and stirred for another 30 minutes. The gel was then charged to an autoclave. The autoclave was heated to 140° C. and maintained at the temperature for 36 hours while stirring at 300 rpm. After cooling, the product was recovered by filtration and washed with deionized water. The resulting product had the XRD pattern of chabazite, an SAR of 5.6 and contained 16.7 wt % $K_2O$. The product was exchanged with ammonium nitrate twice to reduce the potassium content to 2.0 wt % $K_2O$.

Example 5

Ca-exchange of Ammonium Exchanged Chabazite

The sample from Example 4 was subsequently exchanged with calcium nitrate at 80° C. for 2 hours. Following the exchange, the material was filtered, washed with deionized water and then dried.

Example 6

Cu-exchange of Ca-chabazite

The calcium-exchanged chabazite sample from Example 5 was exchanged with copper nitrate at 60° C. for 2 hours. After filtering, washing and drying the sample contained 2.9 wt % CaO and 5.4 wt % CuO.

Example 7

Cu-exchange of Ca-chabazite

The calcium-exchanged chabazite sample from Example 5 was exchanged with copper nitrate at 60° C. for 2 hours. After filtering, washing and drying the sample contained 3.1 wt % CaO and 3.2 wt % CuO.

Sample Performance Evaluation

The surface area of the materials before and after treatments was measured using nitrogen gas adsorption following the BET method. A Quantachrome Autosorb unit was used for these measurements, and the data was collected between relative pressures ($P/P_0$) of 0.01 and 0.05 at liquid nitrogen temperatures.

The nitrogen adsorption data collected at the same time as the surface area measurement were also used to calculate the micropore volume of the materials using the t-plot method.

The activities of the hydrothermally aged materials for $NO_x$ conversion, using $NH_3$ as reductant, were tested with a flow-through type reactor. Powder zeolite samples were pressed and sieved to 35/70 mesh and loaded into a quartz tube reactor. The gas composition for $NH_3$-SCR was 500 ppm NO, 500 ppm $NH_3$, 5 vol % $O_2$, 0.6% $H_2O$ and balance $N_2$. The space velocity was 50,000 $h^{-1}$. Reactor temperature was ramped and NO conversion was determined with an MKS MultiGas infrared analyzer at each temperature interval.

Example 8

Steam Treatment of Cu—Ca-chabazite

This Example comprised the Cu-exchanged Ca-chabazite material from Example 6 that was treated in 60% water/air at 600° C. for 2 h.

Comparable Example 9

Calcination of Cu—Ca-chabazite

This Example comprised the Cu-exchanged Ca-chabazite material from Example 6 that was calcined in air at 550° C. for 2 h.

Example 10

Steam Treatment of Cu—Ca-chabazite

This Example comprised the Cu-exchanged Ca-chabazite material from Example 7 that was treated in 60% water/air at 600° C. for 2 h.

Comparable Example 11

Calcination of Cu—Ca-chabazite

This Example comprised the Cu-exchanged Ca-chabazite material from Example 7 that was calcined in air at 550° C. for 2 h.

Example 12

Steam Treatment of Fe—Ca-chabazite

This Example comprised the Fe-exchanged Ca-chabazite material from Example 3 that was treated in 20% water/air at 600° C. for 2 h.

Comparable Example 13

Calcination of Fe—Ca-chabazite

This Example comprised the Fe-exchanged Ca-chabazite material from Example 3 that was calcined in air at 550° C. for 2 h.

Water Stability Test

Water stability tests were done by slurrying 4 g of material in 12 g of water for 1 hour at ambient temperature. Subsequently, the slurry was filtered, washed and dried. The surface area and micropore volume of the materials were analyzed before and after the water treatment. Results for Examples 8, 10 and 12 as well as Comparable Examples 9, 11 and 13 are shown in Table 1.

TABLE 1

|  | Example | | | | | |
|---|---|---|---|---|---|---|
|  | Ex. 8 | Comp. Ex. 9 | Ex. 10 | Comp. Ex. 11 | Ex. 12 | Comp. Ex. 13 |
| Initial surface area (m²/g) | 630 | 641 | 620 | 589 | 610 | 619 |
| Surface area after water treatment (m²/g) | 626 | 454 | 608 | 455 | 612 | 374 |
| Surface area retention (%) | 99 | 71 | 98 | 77 | 100 | 60 |
| Initial micropore volume (cc/g) | 0.24 | 0.24 | 0.23 | 0.22 | 0.23 | 0.23 |
| Micropore volume after water treatment (cc/g) | 0.24 | 0.17 | 0.23 | 0.17 | 0.23 | 0.14 |

Figure 1:
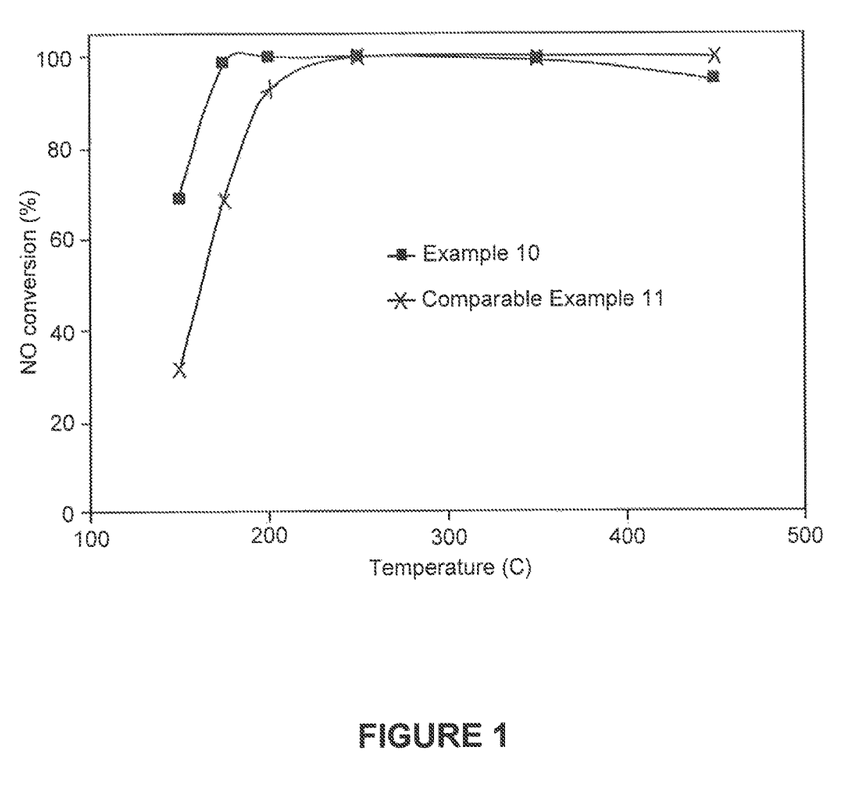
FIG. 1 is a graph comparing NO conversion as a function of temperature for samples after water immersion (Example 10) and Comparable Example 11. All $NH_3$-SCR data were collected under the following conditions: 500 ppm NO; $NH_3/N_0$=1.0; 5 vol % $O_2$; balance $N_2$; space velocity=50,000 $h^{-1}$.

FIG. 1 compares NO conversion percent after water immersion of Example 10 and Comparable Example 11, and the inventive example shows a higher NO conversion percent at lower temperature. The conversion percent for both materials remains essentially constant up to about 400° C.

Figure 2:
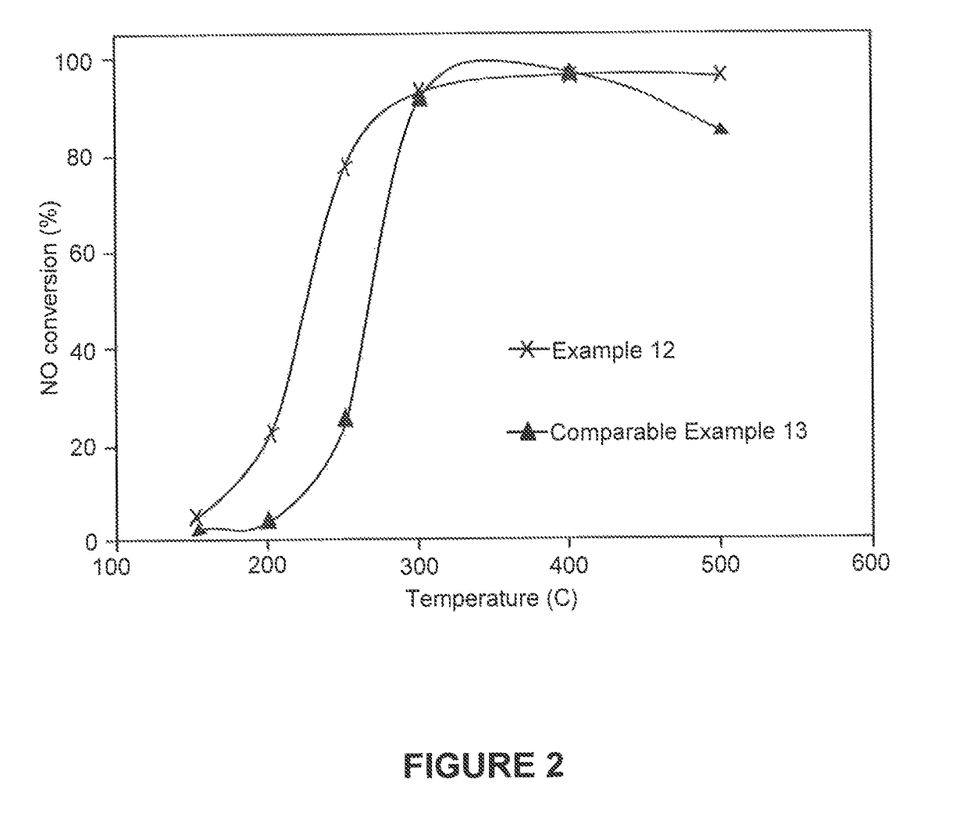
FIG. 2 is a graph comparing NO conversion as a function of temperature for samples after water immersion (Example 12) and Comparable Example 13. All $NH_3$-SCR data were collected under the following conditions: 500 ppm NO; $NH_3/NO$=1.0; 5 vol % $O_2$; balance $N_2$; space velocity=50,000 h-1.

FIG. 2 compares NO conversion percent after water immersion of Example 12 and Comparable Example 13. This Figure graphically shows that the inventive example exhibits a higher NO conversion percent at lower temperature, and a more stable NO conversion percent at higher temperatures.

Example 14

Exchange to Make Cu—Ca-chabazite

The calcium-exchanged chabazite sample from Example 5 was exchanged with copper nitrate at 60° C. for 2 hours. After filtering, washing and drying the sample contained 3.6 wt % CaO and 2.6 wt % CuO.

Example 15

Steam Treatment of Cu—Ca-chabazite

This Example comprised the Cu-exchanged Ca-chabazite material from Example 14 that was treated in 60% H₂O/air at 600° C. for 2 hours.

Example 16

Steam Treatment of Cu—Ca-chabazite

This Example comprised the Cu-exchanged Ca-chabazite material from Example 14 that was treated in 20% H₂O/air at 500° C. for 2 hours.

Comparable Example 17

Calcination of Cu—Ca-chabazite

This Example comprised the Cu-exchanged Ca-chabazite material from Example 14 that was calcined in air at 550° C. for 2 hours.

Comparable Example 18

Steam Treatment of Cu—Ca-chabazite

This Example comprised the Cu-exchanged Ca-chabazite material from Example 6 that was treated in 10% H₂O/air at 750° C. for 16 hours.

Comparable Example 19

Calcination of Cu—Ca-chabazite

This Example comprised the Cu-exchanged Ca-chabazite material from Example 6 that was calcined in air at 550° C. for 2 hours.

The surface area and micropore volume of Examples 15 and 16 as well as of comparable Example 17 were analyzed before and after the water treatment. Results are shown in Table 2.

TABLE 2

|  | Example | | |
|---|---|---|---|
|  | Ex. 15 | Ex. 16 | Comp. Ex. 17 |
| Initial surface area (m²/g) | 621 | 646 | 638 |
| Surface area after water treatment (m²/g) | 610 | 641 | 500 |
| Surface area retention (%) | 98 | 99 | 78 |
| Initial micropore volume (cc/g) | 0.24 | 0.24 | 0.24 |
| Micropore volume after water treatment (cc/g) | 0.23 | 0.24 | 0.18 |

The amount of NH₃ adsorbed, the NH₃ adsorption capacity, was measured using a NH₃ temperature programmed desorption (NH₃-TPD) technique.

Prior to NH₃-TPD, materials were heated in situ in argon at 10° C./min to 520° C. and kept at this temperature for 1 hour. The furnace was then cooled to 100° C. NH₃ was adsorbed onto the zeolite at 100° C. for 1 hour using 2000 ppm NH₃/N₂, followed by flowing argon for 1 hour to remove physisorbed NH₃. During the NH₃-TPD, a ramping rate of 10° C./min from 100 to 650° C. was used while flowing argon and monitoring the thermal conductivity of the outlet gas. The $NH_3$ adsorption capacity for Examples 15-17 expressed in mmol $NH_3$/g zeolite and in molar $NH_3$/Al ratios are shown in Table 3. The $NH_3$ adsorption capacity is also expressed as $NH_3$ retention, i.e. the ratio between the $NH_3$ capacity after steam treatment and the $NH_3$ capacity after calcination.

TABLE 3

|  | Example | | | | |
|---|---|---|---|---|---|
|  | Ex. 15 | Ex. 16 | Comp. Ex. 17 | Comp. Ex. 18 | Comp. Ex. 19 |
| Calcination temperature (C.) |  |  | 550 |  | 550 |
| Steaming temperature (C.) | 600 | 500 |  | 750 |  |
| $NH_3$ adsorption capacity (mmol/g) | 3.13 | 3.50 | 4.91 | 2.67 | 5.20 |
| $NH_3$/Al molar ratio | 0.74 | 0.82 | 1.16 | 0.64 | 1.25 |
| $NH_3$ retention (%) | 64 | 71 | n/a | 51 | n/a |

Examples 15 and 16 have lower $NH_3$ adsorption capacity after steam treatments (3.13 and 3.50 mmol/g) compared with the calcined material in Comparable Example 17 (4.91 mmol/g). These $NH_3$ adsorption capacities for Examples 15 and 16 correspond to $NH_3$ retention values of 64 and 71% relative to the calcined material. The data in Table 3 indicate that the steamed materials with lower $NH_3$ adsorption capacity have higher surface area retention in Table 2 and hence sustain less damage during water exposure than the calcined materials.

The $NH_3$ retention values for Examples 15 and 16 (64 and 71%, respectively) are higher than those for samples steamed at higher temperatures, such as Comparable Example 18 (51%) steamed at 750 C, 16 h (see Table 3). In conjunction, the $NH_3$/Al ratios are also higher for Examples 15 and 16 (0.74 and 0.82 $NH_3$/Al) than for Comparable Example 18 steamed at 750 C (0.64 $NH_3$/Al). The calcined material Comparable Example 17 has a $NH_3$/Al ratio of 1.16, a value high enough to sustain damage during the water exposure test in Table 2. $NH_3$/Al ratios and $NH_3$ retention values that are low enough to avoid low-temperature water damage, but high enough to retain as much of the good SCR performance of the starting material are preferred. In one embodiment, the preferred $NH_3$/Al ratio range is 0.7 to 1.0, such as 0.7 to 0.9. In one embodiment, the preferred $NH_3$ retention range is 60-90%, such as 60-80%.

Examples 14-16 and Comparable Example 17 were also analyzed by powder X-ray diffraction (XRD). Powder XRD data were collected on a Panalytical Empyrean diffractometer operating at 45 kV and 40 mA. The XRD patterns were recorded from 27 to 37 degrees 2-theta using a step size of 0.007 degrees 2-theta and 3 s hold time per step. Si 640d from NIST was added as an internal peak position standard to adjust for variations in peak positions due to differences in sample alignment; the peak at 28.44 degrees 2-theta for Si 640d was used for this correction. The main peak positions in the 27 to 37 degrees 2-theta range are shown in Table 4. The six different peaks in Table 4 correspond to Miller indices [h k l] of [2 1 -2], [2 2 0], [3 -1 -1], [3 -1 -2], [3 1 -2] and [3 2 0]. These data were further fitted in the rhombohedral space group to obtain the unit cell distance and angle.

For Examples 15 and 16, the [3 2 0] peak shifts to lower angles (36.02-36.03 degrees 2-theta) after steam treatments compared with the calcined material in Comparable Example 17 and the starting material in Example 14 (both 36.07 degrees 2-theta) (Table 4). The unit cell angle also decreases upon steaming from 94.61 degrees in Example 14 and 94.58 degrees in Comparable Example 17 to 94.42 and 94.43 degrees in Examples 15 and 16, respectively. The data in Table 4 indicate that the steamed materials with lower angle of the [3 2 0] peak and lower unit cell angle have higher surface area retention and hence sustain less damage during water exposure than the calcined material.

TABLE 4

|  |  | | Example | | | |
|---|---|---|---|---|---|---|
|  | [h k l] | Units | Ex. 14 | Ex. 15 | Ex. 16 | Comp. Ex. 17 |
| Peak position | [2 1 -2] | degrees 2-theta | 27.53 | 27.60 | 27.62 | 27.60 |
| Peak position | [2 2 0] | degrees 2-theta | 28.20 | 28.17 | 28.20 | 28.28 |
| Peak position | [3 -1 -1] | degrees 2-theta | 30.48 | 30.57 | 30.57 | 30.55 |
| Peak position | [3 -1 -2] | degrees 2-theta | 34.35 | 34.45 | 34.45 | 34.42 |
| Peak position | [3 1 -2] | degrees 2-theta | 34.83 | 34.89 | 34.90 | 34.90 |
| Peak position | [3 2 0] | degrees 2-theta | 36.07 | 36.03 | 36.02 | 36.07 |
| Unit cell distance | | Å | 9.391 | 9.380 | 9.377 | 9.374 |
| Unit cell angle | | degrees | 94.61 | 94.42 | 94.43 | 94.58 |

It is appreciated that the materials described herein may be used in article, such as one in the form of a channeled or honeycombed-shaped body; a packed bed, such as balls, pebbles, pellets, tablets, extrudates, other particles, or combinations thereof; microspheres; or structural pieces, such as in the form of plates or tubes.

As one skilled in the art would appreciate, the channeled or honeycombed-shaped body or structural piece is formed by wash-coating said crystalline material onto a preformed honeycombed-shaped body or by extruding a mixture comprising the said crystalline material.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A microporous crystalline material having building units of double-6-rings (d6r) and pore opening of 8-rings, wherein the material comprises a first metal chosen from alkali-earth group, rare-earth group, alkali group or mixtures thereof, and a second metal chosen from copper, iron or mixtures thereof,
   wherein the material has a molar silica to alumina ratio (SAR) from 3 to 12; and
   exhibits an $NH_3$ adsorption capacity expressed as the molar $NH_3$/Al ratio of 0.7 to 0.9.

2. The microporous crystalline material of claim 1, wherein the material has pore openings ranging from 3 to 5 Angstroms.

3. The microporous crystalline material of claim 1, wherein the material comprises structural codes of CHA, LEV, AEI, AFT, AFX, EAB, ERI, KFI, SAT, TSC, and SAV.

4. The microporous crystalline material of claim 3, wherein the material comprises a CHA structure.

5. The microporous crystalline material of claim 4, wherein the CHA structure has a unit cell angle below 94.55 degrees, and a [3 2 0] peak below 36.05 degrees 2-theta.

6. The microporous crystalline material of claim 4, wherein the CHA structure has a unit cell angle ranging from 94.30-94.50 degrees.

7. The microporous crystalline material of claim 1, where the first metal comprises magnesium, calcium, strontium, barium, lanthanum, cerium, praseodymium, neodymium, mixed rare earth oxides, potassium, rubidium, cesium or mixtures thereof.

8. The microporous crystalline material of claim 1, where the first and second metals are introduced into the material by liquid-phase or solid ion-exchange, impregnation or incorporated by direct-synthesis.

9. The microporous crystalline material of claim 1, which has a first metal to aluminum atomic ratio ranging from 0.05 to 0.80.

10. The microporous crystalline material of claim 1, wherein the first metal comprises calcium, and the material has a calcium to aluminum atomic ratio ranging from 0.05 to 0.50.

11. The microporous crystalline material of claim 1, wherein the second metal comprises copper, and the material has a copper to aluminum atomic ratio ranging from 0.05 to 0.20.

12. The microporous crystalline material of claim 1, wherein the second metal comprises iron, and the material has an iron to aluminum atomic ratio ranging from 0.05 to 0.30.

13. The microporous crystalline material of claim 1, wherein the material has a mean crystal size ranging from 0.3 to 5 microns.

14. The microporous crystalline material of claim 1, wherein the material has been steamed at temperatures ranging from 400 to 800° C. in the presence of steam containing 1-100% water for a time of at least 0.1 hours.

15. The microporous crystalline material of claim 1, wherein the material retains at least 80% of its surface area after exposure to conditions that include immersion in water at ambient temperature for 1 hour.

16. The microporous crystalline material of claim 15, wherein the material retains at least 95% of its surface area after said exposure.

17. A method of selective catalytic reduction of nitrogen oxides in exhaust gas, said method comprising:
at least partially contacting said exhaust gases with an article comprising a microporous crystalline material having building units of double-6-rings (d6r) and pore opening of 8-rings, wherein the material comprises a first metal chosen from alkali-earth group, rare-earth group, alkali group or mixtures thereof, and a second metal chosen from copper, iron or mixtures thereof,
wherein the material has a molar silica to alumina ratio (SAR) from 3 to 12; and
exhibits an $NH_3$ adsorption capacity expressed as the molar $NH_3/Al$ ratio of 0.7 to 0.9.

18. The method of claim 17, wherein the material has pore opening ranging from 3 to 5 Angstroms.

19. The method of claim 17, wherein the material comprises structural codes of CHA, LEV, AEI, AFT, AFX, EAB, ERI, KFI, SAT, TSC, and SAV.

20. The method of claim 19, wherein the material comprises a CHA structure.

21. The method of claim 20, wherein the CHA structure has a unit cell angle below 94.55 degrees, and a [3 2 0] peak below 36.05 degrees 2-theta.

22. The method of claim 21, wherein the CHA structure has a unit cell angle ranging from 94.30-94.50 degrees.

23. The method of claim 17, wherein the contacting step is performed in the presence of ammonia, urea, an ammonia generating compound, or a hydrocarbon compound.

24. The method of claim 17, wherein the first metal comprises magnesium, calcium, strontium, barium, lanthanum, cerium, praseodymium, neodymium, mixed rare earth oxides, potassium, rubidium, cesium, or mixtures thereof.

25. The method of claim 17, where the material comprises a mean crystal size ranging from 0.3 to 5 microns.

26. A method of making a microporous crystalline material,
said method comprising synthesizing a material having building units of double-6-rings (d6r) and pore opening of 8-rings, where the material has molar silica to alumina ratio (SAR) from 3 to 12, wherein the material exhibits an $NH_3$ adsorption capacity expressed as the molar $NH_3/Al$ ratio of 0.7 to 0.9;
mixing sources of sodium, potassium, alumina, silica, water and optionally an organic template to form a gel;
heating the gel in a vessel at a temperature ranging from 80 to 200° C. to form a crystalline material;
ammonium-exchanging said material;
introducing a first metal chosen from alkali-earth group, rare-earth group, alkali group or mixtures thereof, and a second metal chosen from copper, iron or mixtures thereof, into said crystalline material by liquid-phase or solid ion-exchange, impregnation; and
steaming said material at 400 to 800° C. in 1 to 100% steam for at least 0.1 hour.

27. The method of claim 26, wherein the gel has potassium to silica ($K/SiO_2$) molar ratio of less than 0.5 and hydroxide to silica ($OH/SiO_2$) molar ratio less than 0.35.

28. The method of claim 26, wherein the gel further comprises a crystalline seed material.

29. The method of claim 26, wherein said first metal and said second metal are incorporated into the structure by direct-synthesis prior to heating said gel.

30. The method of claim 26 wherein said alumina and silica sources comprise potassium-exchanged, proton-exchanged or ammonium-exchanged zeolite Y or; potassium silicate or mixtures thereof.

31. The method of claim 26, wherein said crystal structure comprises structural codes of CHA, LEV, AEI, AFT, AFX, EAB, ERI, KFI, SAT, TSC, and SAV.

32. The method of claim 31, wherein said crystal structure comprises CHA.

33. The method of claim 26, where said first metal comprises magnesium, calcium, strontium, barium, lanthanum, cerium, praseodymium, neodymium, mixed rare earth oxides, potassium, rubidium, cesium, or mixtures thereof.

34. The method of claim 26, wherein the material exhibits a first metal to aluminum atomic ratio ranges from 0.05 to 0.80.

35. The method of claim 26, wherein the first metal comprises calcium and the material has a calcium to aluminum atomic ratio ranging from 0.05 to 0.50.

36. The method of claim 26, wherein the second metal comprises copper and the material has a copper to aluminum atomic ratio ranging from 0.05 to 0.20.

37. The method of claim 26, wherein the second metal comprises iron and the material has an iron to aluminum atomic ratio ranging from 0.05 to 0.30.

38. The method of claim 26, where said material has a mean crystal size ranging from 0.3 to 5 microns.

* * * * *